US009331509B2

(12) United States Patent
Chen et al.

(10) Patent No.: US 9,331,509 B2
(45) Date of Patent: May 3, 2016

(54) CHARGER SYSTEM, DIGITAL INTERFACE CIRCUIT AND ASSOCIATED CONTROL METHOD

(71) Applicant: Chengdu Monolithic Power Systems Co., Ltd., Chengdu (CN)

(72) Inventors: Da Chen, Chengdu (CN); Zhengwei Zhang, Chengdu (CN); Yue Leng, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 263 days.

(21) Appl. No.: 14/063,796

(22) Filed: Oct. 25, 2013

(65) Prior Publication Data

US 2014/0117924 A1 May 1, 2014

(30) Foreign Application Priority Data

Oct. 29, 2012 (CN) .......................... 2012 1 0419663

(51) Int. Cl.
*H01M 10/46* (2006.01)
*H02J 7/00* (2006.01)

(52) U.S. Cl.
CPC ............. *H02J 7/0063* (2013.01); *H02J 7/0068* (2013.01)

(58) Field of Classification Search
CPC .............................. H02J 7/0011; H02J 7/0021
USPC ........................ 320/107, 132, 134, 136, 137
See application file for complete search history.

(56) References Cited

U.S. PATENT DOCUMENTS

| 6,268,715 | B1 * | 7/2001 | Oglesbee | H01M 10/46 320/156 |
| 6,459,175 | B1 * | 10/2002 | Potega | B60L 11/185 307/132 M |
| 7,081,737 | B2 * | 7/2006 | Liu | H01M 10/441 320/130 |
| 2013/0169038 | A1 * | 7/2013 | King | H02J 7/0031 307/66 |

* cited by examiner

*Primary Examiner* — Edward Tso
(74) *Attorney, Agent, or Firm* — Perkins Coie LLP

(57) ABSTRACT

A charger system with a digital interface circuit, wherein the digital interface circuit has an N-bit control register, wherein N is a positive integer no less than 2, and wherein the N-bit register has a primary state machine, at a first portion of addresses of the control register, configured to instruct operation statuses of a system management bus host; and a secondary state machine, at a second portion of addresses of the control register, configured to instruct a data bit of transmission of a corresponding control instruction under each of the operation statuses of the system management bus host.

6 Claims, 3 Drawing Sheets

CHARGER SYSTEM, DIGITAL INTERFACE CIRCUIT AND ASSOCIATED CONTROL METHOD

CROSS-REFERENCE TO RELATED APPLICATION(S)

This application claims the benefit of CN application No. CN201210419663.8, filed on Oct. 29, 2012, and incorporated herein by reference.

TECHNICAL FIELD

The present invention relates to charger system, and more specifically but not exclusively relates to a digital control battery charger system and associated control method.

BACKGROUND

As the electronic devices integrate more functions and own higher performance, the structure and technology become more complicated. As in smart battery management system, the interface circuit conventionally has two control methods. One method is applying traditional analogy circuit for control. However, the traditional analogy circuit could not be complicated enough to meet the requirement of smart battery management, and also has high cost. The other method is applying digital coding to achieve fully digital control. Generally, a digital interface circuit is simple and easy to expand. With the advantages of quick response, high integration and easy control, the digital interface circuit represents the developing trend in the area of smart power management.

In the digitally controlled smart battery management system, it conventionally utilizes system management bus (SMBus) for control. The digital interface circuit is in the front-side thereof, configured to receive and to transfer relevant information signals from system management bus. When the digital coding is applied, the digital interface circuit may comprise a plurality of registers, e.g. control registers, buffer registers, data registers, and etc. The control registers comprise status-machines which control and coordinate with other registers for completing the transfer procedure, for example, to confirm the bit number of smart charging states, or to confirm the data bit number of each status.

FIG. 1 illustrates a schematic diagram of a prior art control register. As shown in FIG. 1, a digital interface 110 is in the front side of a control circuit 100 and comprises registers 111 and 112, wherein register 111 is a transmission state register comprising a first state machine configured to confirm the transmission status of the SM bus. Register 112 is a state counter register comprising a second state machine configured to confirm the corresponding data bit number of transmission of a corresponding control instruction under each transmission status, and to synchronize it with external serial clock line (SCL) of the smart battery system. The transmission state register 111 and the state counter register 112 together comprise the control register, configured to generate control signals to an instruction bus 113 in control circuit 100. However, excessive numbers of registers may be adverse for integration and increase the cost.

SUMMARY

One embodiment of the present invention discloses a charger system comprising a power supply circuit, a load, a battery, a system management bus (SMBus) host, a control circuit, a first switch and a second switch, wherein the control circuit comprises a digital interface circuit, and wherein the digital interface circuit comprises an N-bit control register, and wherein N is a positive integer no less than 2, and wherein the N-bit register comprises: a primary state machine at a first portion of addresses of the control register, configured to instruct operation statuses of the SMBus host; and a secondary state machine, at a second portion of addresses of the control register, configured to instruct a data bit of transmission of a corresponding control instruction under each of the operation statuses of the SMBus host.

Another embodiment of the present invention discloses a digital interface circuit for charger system management, comprising a control register, wherein the control register is an N-bit register, N≥2, wherein the N-bit register comprises: a primary state machine, at a first portion of addresses of the control register, configured to instruct operation statuses of the SMBus host; and a secondary state machine, at a second portion of addresses of the control register, configured to instruct a data bit number of transmission of a corresponding control instruction under each of the operation statuses of the SMBus host.

Yet another embodiment of the present invention discloses a method to control a digital interface circuit in a charger system, wherein the digital interface circuit receives a battery information signal from a system management bus (SMBus) host through a clock line and a data line, and wherein an N-bit register is utilized as a control register in the digital interface circuit, N≥2, and wherein the method comprises: applying a first portion of addresses of the control register as a primary state machine, configured to instruct operation statuses of the SMBus host; and applying a second portion of the addresses of the control register as a secondary state machine, configured to instruct a data bit number of transmission of a corresponding control instruction under each of the operation statuses of the SMBus host.

The embodiment described above may achieve a relatively low cost for the battery charger system and the digital interface circuit.

BRIEF DESCRIPTION OF THE DRAWINGS

Non-limiting and non-exhaustive embodiments are described with reference to the following drawings. The drawings are not depicted to scale and only for illustration purpose.

The use of the same reference label in different drawings indicates the same or like components.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 2:
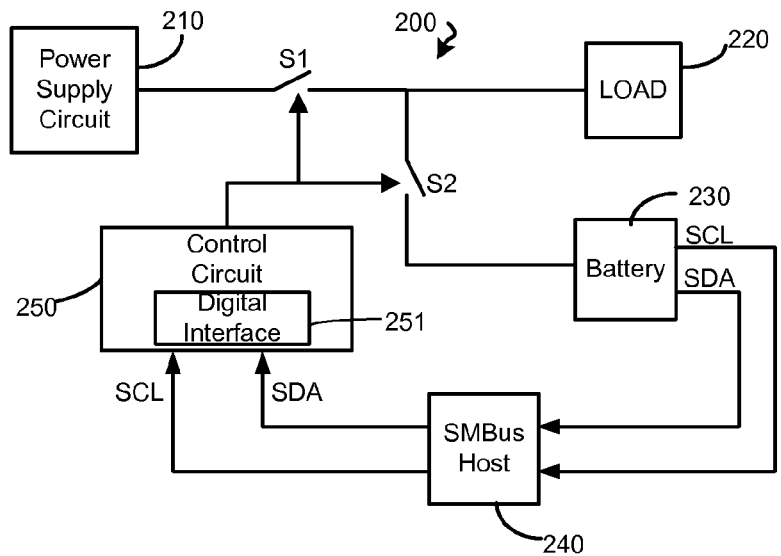
FIG. 2 shows a schematic block diagram of a charger system 200 with smart battery management bus (SMBus) according to an embodiment of the present invention.

FIG. 2 is a schematic block diagram of a charger system 200 with smart battery system management bus (SMBus) according to an embodiment of the present invention. The charger system 200 comprises a power supply circuit 210, a load 220, a battery 230, a SMBus host 240, a control circuit 250, and switches S1, S2 as current path switches. Wherein, the control circuit 250 comprises a digital interface circuit 251 at the front side of the control circuit 250. The charger system 200 may further comprise a data line SDA and a clock line SCL. The power supply circuit 210 is coupled to a first end of the switch S1, and a second end of switch S1 is coupled to a first end of the switch S2 and the load 220. A second end of the switch S2 is coupled to a first end of the battery 230. The battery 230 is further coupled to the SMBus host 240 through the data line SDA and the clock line SCL. The SMBus is inside the SMBus host 240 and generates a battery information signal to the control circuit 250 through the data line SDA and the clock line SCL. The control circuit 250 generates control signals to control the switches S1 and S2 on and off.

When the switches S1 and S2 are turned on, an input voltage supplies power to the load 220 via the power supply circuit 210, and also charges the battery 230. When the switch S1 is turned off and the switch S2 is turned on, the battery 230 supplies power to the load 220. Via the digital interface circuit 251, the control circuit 250 receives the battery information signal from SMBus host 240, configured to control the switches S1 and S2 on and off. According to the read-write protocol of the SMBus, when the data line SDA flops from logic high to logic low, and if the clock line SCL remains in logic high, the SMBus host 240 occupies the SMBus. When the SMBus host 240 completes the data transmission, the data line SDA flips from logic low to logic high. And if the clock line SCL is at logic high, the SMBus is released. Except the states of connection start and connection end, other states could be changed only if the clock line SCL is at logic low.

One with ordinary skill in the art should understand that in other embodiments, the system may comprise one or more current path switches besides the switches S1 and S2.

Figure 3:
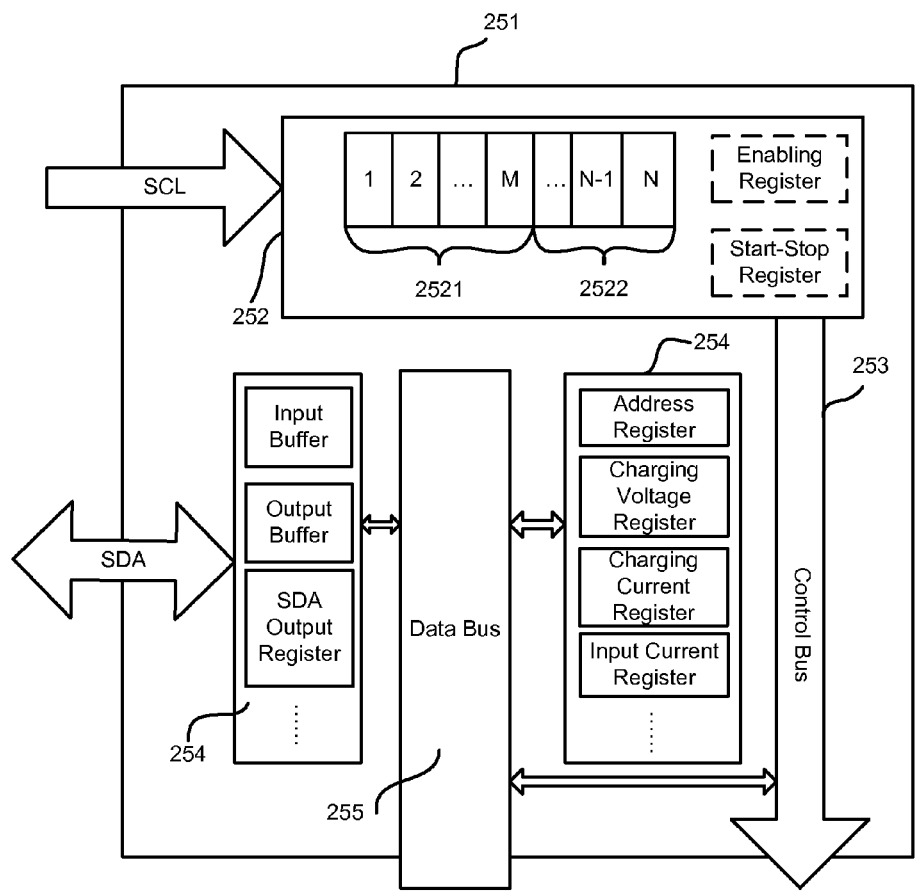
FIG. 3 illustrates a schematic circuitry diagram of a digital interface circuit 251 according to an embodiment of the present invention.

FIG. 3 illustrates a schematic circuitry diagram of the digital interface circuit 251 according to an embodiment of the present invention. As shown in FIG. 3, the digital interface circuit 251 comprises a control register 252. In one embodiment, the control register 252 is an N-bit register, comprising two state machines, i.e. a primary state machine 2521 and a secondary state machine 2522. Wherein, N≥2. The primary state machine 2521 is arranged at a first portion of addresses of the control register 252. The secondary state machine 2522 is arranged at a second portion of addresses of the control register 252. In one embodiment, the first portion of addresses is from a first bit to an $M^{th}$ bit of the N-bit register, and the secondary portion of addresses is from an $M+1^{th}$ bit to an $N^{th}$ bit, wherein M is a positive integer, M<N. And N≥3. The primary state machine instructs the operation status of the SMBus host 240. In one embodiment, the operation status of SMBus host 240 comprises starting, reading, writing, shutting down and etc. The secondary state machine instructs data bit of transmission of the control instruction to synchronize with the clock line SCL. In one embodiment, the SMBus host 240 comprises $2^3$ operation statuses. Thus the primary state machine 2521 is a 3 bit binary counter, and M=3. The primary state machine 2521 is addressed at the first 3 bit of the control register 252. The secondary state machine 2522 is a 4 bit binary counter, addressed from the 4th bit to 7th bit of the control register 252. Accordingly for each operation status of the SMBus host 240, the highest data bit number of control instruction is $2^4-1$.

One with ordinary skill in the art could understand that in other embodiments, the first portion of addresses and the second portion of addresses may be differently arranged from the above embodiment. For example, in another embodiment, the first portion of addresses may be the odd bits of the control register 252, and the second portion of addresses may be the even bits of the control register 252. In yet another embodiment, the first portion of addresses may be the first K bits of the control register 252, and the second portion of addresses may be from $M^{th}$ bit to $N^{th}$ bit, wherein K, M and N are positive integers and N>K>M. Thus a portion of the control register is shared by the primary state machine and the secondary state machine.

One with ordinary skill in the art could also understand that in other embodiment, the digital interface circuit 251 may further comprise a control bus 253, a data register 254 and a data bus 255 besides the control register 252. The control register 252 receives the information on the clock line SCL, and is configured to generate the control instruction to the control bus 253 in control circuit 250 according to the primary state machine 2521 and the secondary state machine 2522. The control bus 253 is further coupled to the data bus 255, enabling the control instruction to control data exchange between the data register 254 and the data line SDA through the data bus 255, and to determine the ON and OFF of switches S1 and S2. In some embodiments, the data register 254 in the charger system 200 may comprise a plurality of types of register, e.g. address data register, charging voltage data register, charging current data register, input current data register, input buffer, output buffer and etc.

One with ordinary skill in the art could also understand that in other embodiments, the control register 252 may comprise two or more registers. For an instance, besides the above mentioned N-bit register that comprises the primary state machine and the secondary state machine, the control register 252 may further comprise enabling register, start-stop detecting register, and etc.

Figure 1:
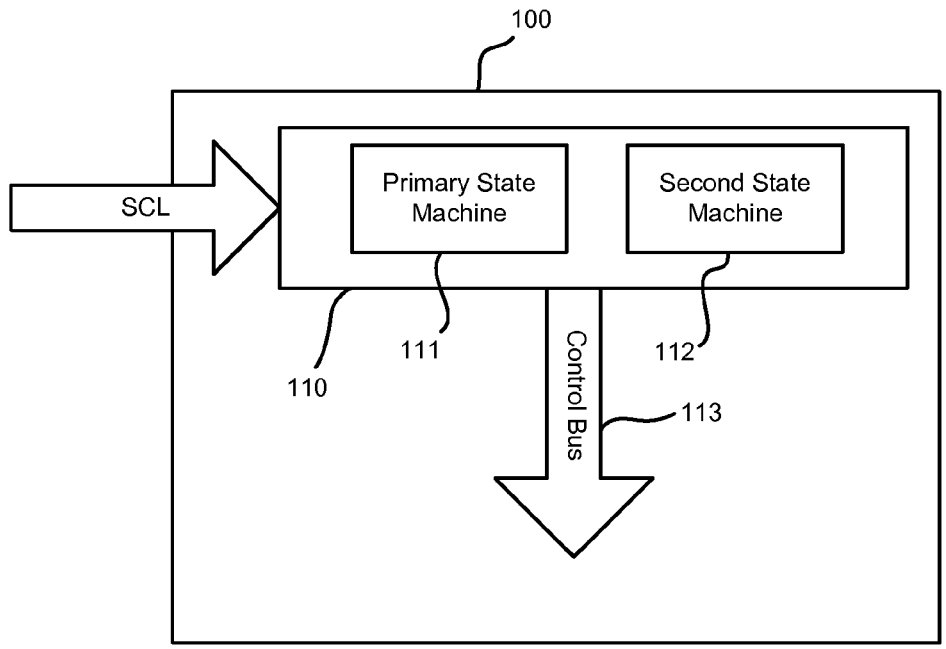
FIG. 1 illustrates a prior art schematic diagram of control register.

Compared with the prior art shown in FIG. 1, the control register 252 in illustrated embodiment shown in FIG. 3 applies only an N-bit register to control the SMBus host 240. The N-bit register comprises two state machines, i.e. primary state machine 2521 and secondary state machine 2522, respectively configured to instruct the operation statuses of SMBus host 240 and data bit of transmission of the corresponding control instruction under each of the host statuses.

Figure 4:
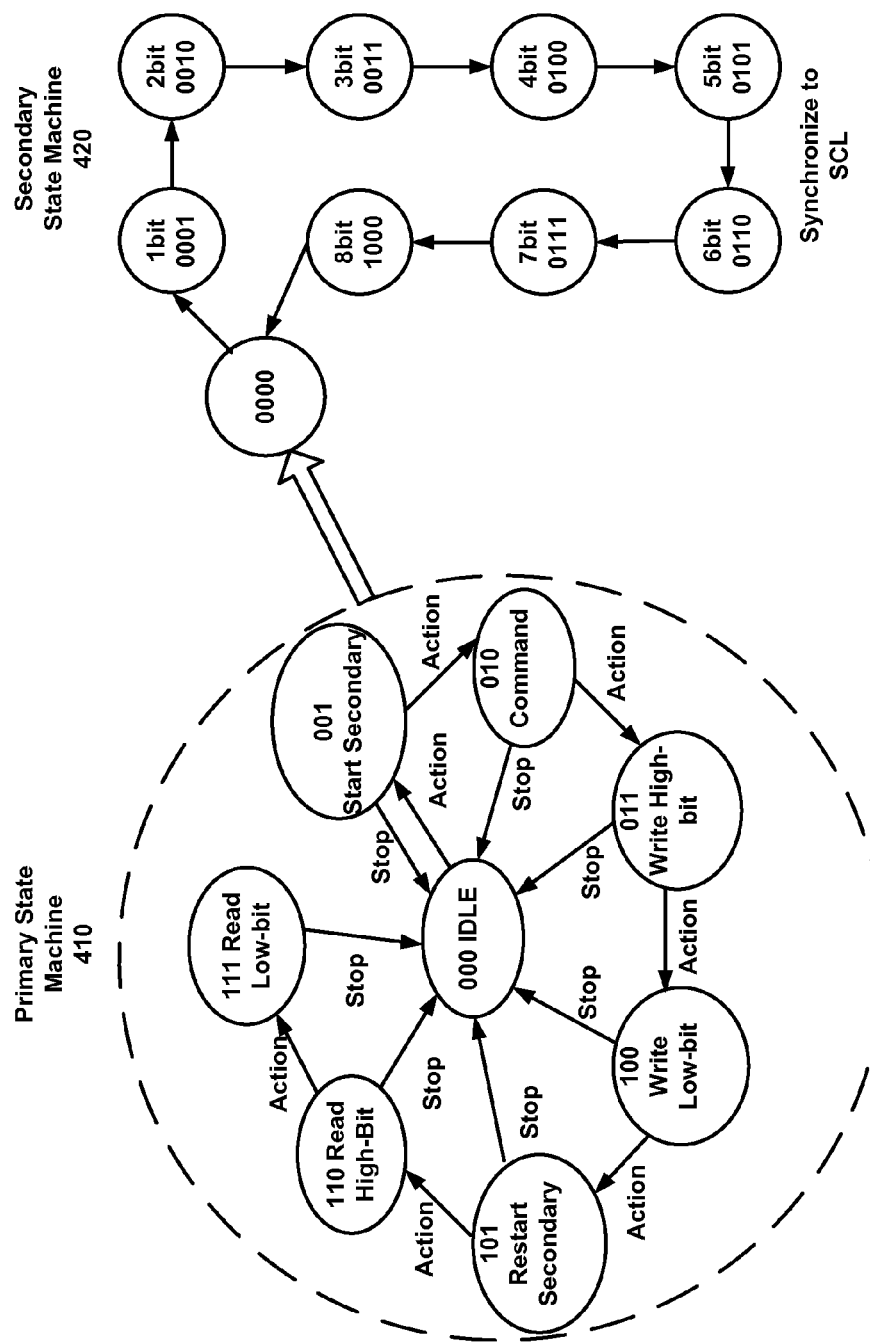
FIG. 4 illustrates a schematic diagram of an operation process flow of a control register according to an embodiment of the present invention.

FIG. 4 illustrates a schematic diagram of an operation process flow of a control register according to an embodiment of the present invention. As shown in FIG. 4, the control register comprises a primary state machine 410 and a secondary state machine 420, wherein binary numbers of the primary state machine 410 from low to high orderly corresponds to each of the operation statuses of the SMBus host. When the system is operating normally, there are 8 operation statuses, i.e. idle status, starting secondary state machine status, command status, writing high-bit status, writing low-bit status, restarting secondary state machine status, reading high-bit status, and reading low-bit status. Therefore, the primary state machine is a 3-bit binary state machine (M=3). The binary number 000 represents idle status. The binary number 001 represents starting the secondary state machine. The binary number 010 represents command status. The binary number 011 represents writing high-bit status. The binary number 100 represents writing low-bit status. The binary number 101 represents restarting the secondary state machine. The binary number 110 represents reading high-bit status. And the binary number 111 represents reading low-bit status.

In the embodiment shown in FIG. 4, the secondary state machine 420 is synchronous to the clock line SCL. The data bit of serial transmission is 8-bit. Therefore, a 4-bit binary number is required to represent the data bit number of the serial transmission. The secondary state machine is a 4-bit binary state machine. The data bit number of the transmission of corresponding control instruction under each operation status of the SMBus host is equal to the binary number of the secondary state machine from low to high orderly. The binary number 1000 represents the data bit number of SMBus host transmission is 8-bit. The binary number 0111 represents the data bit number of SMBus host transmission is 7-bit, and by this analogy. One with ordinary skill in the art should understand in other embodiments, a 4-bit secondary state machine could represent at most $2^4-1$ data bit of SMBus host transmission. Accordingly, in the embodiment shown in FIG. 4, the control register could transmit a 7-bit binary number to the control bus, wherein the first 3 bits represent the operation status of the SMBus host, and the last 4 bits represent the data bit number of the serial transmission of the control instruction.

It should be noted that the present invention is not limited to the embodiment shown in FIG. 4. In other embodiments, the bit of the binary number for the primary state machine and the secondary state machine could be freely extended according to requirement. In another embodiment, the control register may be required for functions of error detecting and addressing. Thus the primary state machine is required for two more statuses, which makes the primary state machine 410 be changed from a 3-bit state machine to a 4-bit state machine. For example, the primary state machine may apply the binary number 0000 to represent idle status. The binary number 0001 represents starting the secondary state machine. The binary number 0010 represents command status. The binary number 0011 represents writing high-bit status. The binary number 0100 represents writing low-bit status. The binary number 0101 represents restarting the secondary state machine. The binary number 0110 represents reading high-bit status. The binary number 0111 represents reading low-bit status. The binary number 1000 represents error detecting. And the binary 1001 represents addressing. A 4-bit primary state machine could at most represent $2^4$ operation statuses. In yet another embodiment, the data bit of serial transmission may be 16 bits. Thus the secondary state machine should be extended to a 5-bit state machine. Wherein the binary number 10000 represents the data bit of SMBus host transmission is 16-bit. The binary number 01111 represents the data bit of SMBus host transmission is 15-bit, and by this analogy. The 5-bit secondary state machine could at most represent $2^5-1$ data bit of the SMBus host transmission. Other extending situation could also be by this analogy.

The above description and discussion about specific embodiments of the present invention is for purposes of illustration. However, one with ordinary skill in the relevant art should know that the invention is not limited by the specific examples disclosed herein. Variations and modifications can be made on the apparatus, methods and technical design described above. Accordingly, the invention should be viewed as limited solely by the scope and spirit of the appended claims.

We claim:

1. A charger system, comprising a power supply circuit, a load, a battery, a system management bus (SMBus) host, a control circuit, a first switch and a second switch, wherein the control circuit comprises a digital interface circuit, and wherein the digital interface circuit comprises an N-bit control register, and wherein N is a positive integer no less than 2, and wherein the N-bit control register comprises:
    a primary state machine, at a first portion of addresses of the N-bit control register, configured to instruct operation statuses of the SMBus host;
    a secondary state machine, at a second portion of addresses of the N-bit control register, configured to instruct data bit of transmission of a corresponding control instruction under each of the operation statuses of the SMBus host;
    wherein the charger system further comprises a data line and a clock line, wherein the power supply circuit is coupled to a first end of the first switch, a second end of the first switch is coupled to a first end of the second switch and the load, a second end of the second switch is coupled to a first end of the battery, the battery is further coupled to the SMBus host through the data line and the clock line, the SMBus host is further configured to provide a battery information signal to the control circuit through the data line and the clock line, and the control circuit is further configured to provide a control signal to control the ON and OFF of the first switch and the second switch;
    the digital interface circuit further comprises a control bus, a data register and a data bus, wherein the control register is configured to receive information from the clock line and provide the control instruction according to the primary state machine and the secondary state machine; and
    wherein the control bus is further coupled to the data bus, enabling the control instruction to control data exchange between the data register and the data line through the data bus, and to decide the ON and OFF of the first switch and the second switch.

2. The charger system according to claim 1, wherein the first portion of addresses are from a first bit to an $M^{th}$ bit of the N-bit control register, and wherein the second portion of addresses are from an $M+1^{th}$ bit to an $N^{th}$ bit, wherein M, N are positive integers, and M<N, N≥3.

3. The charger system according to claim 2, wherein M=3 and N=7.

4. The charger system according to claim 1, wherein the first portion of addresses are odd bits of the N-bit control register, and wherein the second portion of addresses are even bits of the N-bit control register.

5. The charger system according to claim 1, wherein the first portion of addresses are from a first bit to a $K^{th}$ bit, and wherein the second portion of addresses are from an $M^{th}$ bit to an $N^{th}$ bit, wherein the K, M, N are positive integers, and M<K<N, N≥3.

6. A charger system, comprising a power supply circuit, a load, a battery, a system management bus (SMBus) host, a control circuit, a first switch and a second switch, wherein the control circuit comprises a digital interface circuit, and wherein the digital interface circuit comprises an N-bit control register, and wherein N is a positive integer no less than 2, and wherein the N-bit control register comprises:

a primary state machine, at a first portion of addresses of the N-bit control register, configured to instruct operation statuses of the SMBus host;

a secondary state machine, at a second portion of addresses of the N-bit control register, configured to instruct data bit of transmission of a corresponding control instruction under each of the operation statuses of the SMBus host; and wherein the control register further comprises an enabling register and a start-stop detecting register.

* * * * *